(12) United States Patent
Mazurkiewicz et al.

(10) Patent No.: US 10,837,924 B2
(45) Date of Patent: Nov. 17, 2020

(54) ENCODING INFORMATION IN CHEMICAL CONCENTRATIONS

(71) Applicant: HEWLETT-PACKARD DEVELOPMENT COMPANY, L.P., Spring, TX (US)

(72) Inventors: Paul Howard Mazurkiewicz, Fort Collins, CO (US); Paul Hubbard Ford, Fort Collins, CO (US); Troy A Farrar, Fort Collins, CO (US); Jon R Hall, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/332,811

(22) PCT Filed: Oct. 5, 2016

(86) PCT No.: PCT/US2016/055556
§ 371 (c)(1),
(2) Date: Mar. 13, 2019

(87) PCT Pub. No.: WO2018/067145
PCT Pub. Date: Apr. 12, 2018

(65) Prior Publication Data
US 2019/0219526 A1 Jul. 18, 2019

(51) Int. Cl.
*G01N 23/223* (2006.01)
*G01N 23/22* (2018.01)
(Continued)

(52) U.S. Cl.
CPC ........... *G01N 23/223* (2013.01); *G01N 23/22* (2013.01); *G01N 23/2202* (2013.01);
(Continued)

(58) Field of Classification Search
CPC .. B33Y 40/10; B33Y 50/02; C12Q 2565/514; B01J 2219/0054; B01J 2219/00572; G06T 1/0007; G06T 1/0021; G06T 7/00; G06T 7/0002; G06T 7/0004; G06T 7/0008; G06T 7/001; G06T 2207/10; G06T 2207/10064; G06T 2207/10116; G06T 2207/10121; G06T 2207/20; G06T 2207/30;
(Continued)

(56) References Cited

U.S. PATENT DOCUMENTS 5,677,187 A 10/1997 Anderson, II et al.
6,274,381 B1 8/2001 Pauls et al.
(Continued)

FOREIGN PATENT DOCUMENTS

EP 1936539 A1 6/2008
GB 1532022 A 11/1978
(Continued)

*Primary Examiner* — Anastasia Midkiff
(74) *Attorney, Agent, or Firm* — HPI Patent Department

(57) ABSTRACT

A method of extracting information encoded in a product includes: determining a concentration of a non-functional amount of a chemical in a product, where the concentration corresponds to one of a plurality of possible concentration ranges, where each of the plurality of possible concentration ranges indicates different non-composition manufacturing information about the product.

17 Claims, 8 Drawing Sheets

| Concentrration in ppm | Plant | Weekday |
|---|---|---|
| 0 to 50 | None - Counterfeit | N/A |
| 50 to 99 | Argyle | N/A |
| 100 to 119 | Argyle | Monday |
| 120 to 139 | Argyle | Tuesday |
| 140 to 159 | Argyle | Wednesday |
| 160 to 179 | Argyle | Thursday |
| 180 to 199 | Argyle | Friday |
| 200 to 250 | Argyle | N/A |
| 250 and higher | None - Counterfeit | N/A |

(51) Int. Cl.
*G01N 23/2202* (2018.01)
*G01N 23/2206* (2018.01)

(52) U.S. Cl.
CPC ... *G01N 23/2206* (2013.01); *G01N 2223/076* (2013.01); *G01N 2223/0766* (2013.01); *G01N 2223/302* (2013.01)

(58) Field of Classification Search
CPC ............ G06T 2207/30108; G01N 1/28; G01N 23/22; G01N 23/2202; G01N 23/2206; G01N 23/223; G01N 2223/00; G01N 2223/05; G01N 2223/056; G01N 2223/076; G01N 2223/0766; G01N 2223/30; G01N 2223/302; G01N 2223/303; G01N 2223/3037; G01N 2223/60; G01N 2223/612; G01N 2223/645; G01N 2223/652; G01N 2291/022; G01N 2291/0224; G01N 2291/024; G01N 2291/028
See application file for complete search history.

(56) References Cited

U.S. PATENT DOCUMENTS

| | | |
|---|---|---|
| 7,875,457 B2 | 1/2011 | Wang et al. |
| 8,517,274 B2 | 8/2013 | Ciurczak et al. |
| 9,156,708 B2 | 10/2015 | Green et al. |
| 2006/0035288 A1 | 2/2006 | Green et al. |
| 2011/0111225 A1 | 5/2011 | Gabriele et al. |
| 2012/0184038 A1* | 7/2012 | Green ................ C01C 1/086 436/56 |
| 2016/0187314 A1 | 6/2016 | Blumenfeld et al. |

FOREIGN PATENT DOCUMENTS

| | | |
|---|---|---|
| WO | WO-9833162 A1 | 7/1998 |
| WO | WO-2008002987 A2 | 1/2008 |
| WO | WO-2010102032 A2 | 9/2010 |
| WO | WO-2014058582 A1 | 4/2014 |

* cited by examiner

100

110
Determining a concentration of a non-functional amount of a chemical in a product, wherein the concentration corresponds to one of a plurality of possible concentrations, wherein each of the plurality of possible concentration indicates different manufacturing information about the product.

| Sample ID | [Na] in ppm | [Cl] in ppm | [Na]/[Cl] |
|---|---|---|---|
| Test Sample 1 | 362 | 720 | 50.3% |
| Test Sample 2 | 108 | 700 | 15.4% |
| Test Sample 3 | 0 | 0 | 0.0% |
|  |  |  |  |
|  |  |  |  |

| [Na]/[Cl] Minimum | [Na]/[Cl] Maximum | Encoded Data |
|---|---|---|
| 0.0% | 9.9% | None- Counterfeit |
| 10.0% | 19.9% | Manufacturing Plant Argyle |
| 20.0% | 29.9% | None- Counterfeit |
| 30.0% | 39.9% | None- Counterfeit |
| 40.0% | 49.9% | Manufacturing Plant Duncan |
| 50.0% | 59.9% | Manufacturing Plant Everett |
| 60.0% | 200.0% | None- Counterfeit |

| Concentrration in ppm | Plant | Weekday |
|---|---|---|
| 0 to 50 | None - Counterfeit | N/A |
| 50 to 99 | Argyle | N/A |
| 100 to 119 | Argyle | Monday |
| 120 to 139 | Argyle | Tuesday |
| 140 to 159 | Argyle | Wednesday |
| 160 to 179 | Argyle | Thursday |
| 180 to 199 | Argyle | Friday |
| 200 to 250 | Argyle | N/A |
| 250 and higher | None - Counterfeit | N/A |

*Fig. 4*

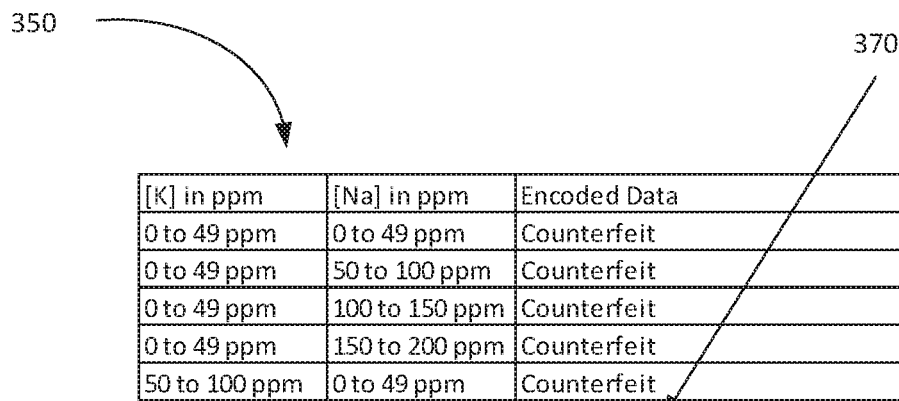

| [K] in ppm | [Na] in ppm | Encoded Data |
|---|---|---|
| 0 to 49 ppm | 0 to 49 ppm | Counterfeit |
| 0 to 49 ppm | 50 to 100 ppm | Counterfeit |
| 0 to 49 ppm | 100 to 150 ppm | Counterfeit |
| 0 to 49 ppm | 150 to 200 ppm | Counterfeit |
| 50 to 100 ppm | 0 to 49 ppm | Counterfeit |
| 50 to 100 ppm | 50 to 100 ppm | Lot 0100 |
| 50 to 100 ppm | 100 to 150 ppm | Lot 0101 |
| 50 to 100 ppm | 150 to 200 ppm | Lot 0102 |
| 100 to 150 ppm | 0 to 49 ppm | Counterfeit |
| 100 to 150 ppm | 50 to 100 ppm | Lot 0103 |
| 100 to 150 ppm | 100 to 150 ppm | Lot 0104 |
| 100 to 150 ppm | 150 to 200 ppm | Lot 0105 |
| 150 to 200 ppm | 0 to 49 ppm | Counterfeit |
| 150 to 200 ppm | 50 to 100 ppm | Lot 0106 |
| 150 to 200 ppm | 100 to 150 ppm | Lot 0107 |
| 150 to 200 ppm | 150 to 200 ppm | Lot 0108 |
| 200+ ppm | any | Counterfeit |
| any | 200+ ppm | Counterfeit |

*Fig. 5*

ENCODING INFORMATION IN CHEMICAL CONCENTRATIONS

BACKGROUND

Inspection and traceability for many components have increased over the past few decades. Increasingly, incoming components are inspected for not just dimensional or electronic characteristics but for composition. The introduction of Restriction of Hazardous Substances (RoHS) in Europe to reduce the use of certain elements has increased adoption of material compositional inspection. Further, concerns about source security, counterfeiting, regulations, and safety continue to encourage more rigorous testing regimes.

BRIEF DESCRIPTION OF THE DRAWINGS

The accompanying drawings illustrate various examples of the subject matter described herein and are a part of the specification. The illustrated examples are intended to illustrate and do not limit the scope of the claims. Throughout the drawings, identical reference numbers designate similar, but not necessarily identical, elements.

FIG. 1 shows a flowchart of a method according to one example of the subject matter described herein.

FIGS. 3A and 3B shows a table and an index accordingly to one example of the subject matter described herein.

FIG. 4 shows an index according to an example of the subject matter described herein.

FIG. 5 shows an index according to an example of the subject matter described herein.

DETAILED DESCRIPTION

Figure 2A:
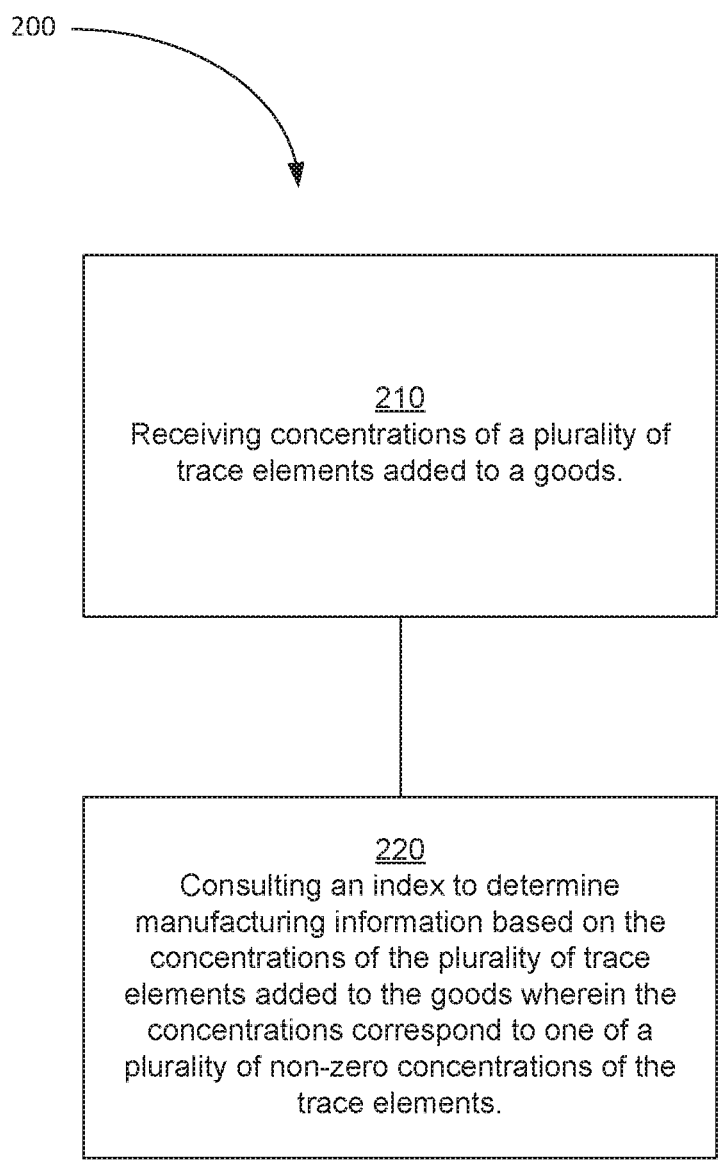
FIGS. 2A-2C show flowcharts describing examples of the subject matter described herein

Tracking supply chain information is a challenge to operating a company. Inventory tracking helps assure that materials match what is specified in any given bill of materials. Inventory tracking also helps to ensure that materials are from approved vendors or comply with laws like the Dodd-Frank Act, which covers tracking and reporting on the sources of conflict minerals used in products.

Vendor lists and supply contracts may limit the allowed materials or the composition of materials. For example, approved fluxes and solders may be a very small subset of fluxes and solders that could be used on printed circuit assemblies. The use of a non-approved material can lead to short and long term reliability issues in the field. For example, unapproved materials may produce cracking solder joints, shorts due to conductive materials used in fluxes. Non-approved materials may also result in non-compliance with regulations like Registration, Evaluation, Authorization, and Restriction of Chemicals (REACH) and Restriction of Hazardous Substances (RoHS).

Tracking conflict mineral may entail a large paper trail. The volume of paperwork may render the system vulnerable to potential forgery and other deception. Because of the difficulties of tracking conflict minerals such as tin, tantalum and gold after they have been processed, current approaches involve primarily paper trails. In a similar manner, RoHS due diligence may also be based on screening inside the company and a paper based tracking system that relies on the honesty and accuracy of suppliers and sub-suppliers spread out over the globe.

Testing materials for substance content is currently a principle tool used to validate material compliance and traceability. Recent regulations have called out substances, for example, phthalates whose detection may use expensive test methodologies, such as gas chromatography-mass spectroscopy (GCMS) or nuclear magnetic resonance (NMR). Extending existing test plan frequencies used in current supply chain models to these new regulated substances introduces additional expense to supply chains.

Additionally, companies may be targeted by counterfeit part sellers. Counterfeit parts may lead to reliability and/or other quality issues. The use of counterfeit parts may damage a company's reputation as counterfeits frequently include sub-standard materials that do not operate as intended. Having methods to detect counterfeit parts can reduce a company's risk.

The use of trace element or trace component analysis may be used to identify the source of natural materials. For example, minerals or natural product of the same type from sources may have distinctive trace elements distributions. Often these trace element differences do not impact the bulk properties or performance of the materials. Accordingly, these differences may just be detectable using appropriate testing. A database may be generated with a body of samples from established sources. The unidentified sample may be tested and compared with the other samples using a variety of best fit, pattern recognition, or principle component analytical techniques. The unidentified sample may then be assigned a source based on the match between the trace elements in the sample and those in the reference samples or by the lack of a match.

Most artificial or processed materials tend to have minimal amounts of adventitious trace elements. Generally speaking, it may be difficult by comparison of the products to differentiate a component produced by supplier A vs. supplier B. This is especially true when the suppliers are using a common process with common source materials. However, when performing corrective and preventative action (CAPA) and/or similar activities, the inability to trace a component or subcomponent to a specific supplier may impede identification of a root cause.

The present specification describes, inter alia, a variety of approaches for enhancing the traceability of materials. For example, this may include introducing markers into the material or labeling and then later detecting or verifying the presence or absence of the markers. The introduced markers may be a compound with an element not otherwise found in the material. For example, introducing sodium chloride (NaCl) into a polyethylene polymer (PE). Later, the level of sodium and chloride are detected in the polymer and the levels of those materials used to identify manufacturing information about the polyethylene component. In one example, the manufacturing information includes the source of the component. The manufacturing information may include day of the week or date information. The manufacturing information may include a model number or revision number. The manufacturing information may include the manufacturing specification version used to produce the part. The manufacturing information may include any desired information that can be fit into the available encoding scheme. As used in this specification, the manufacturing information does not include the actual levels of the trace elements as this information is inherent. Instead, the trace elements are used to encode other information. Retaining some unused combinations may help to enhance the detection of counterfeit products. In one example, some of the combinations that include none of a trace element are used to detect counterfeit parts.

X-ray fluorescence spectroscopy (XRF) provides an increasingly available tool to rapidly and cost-effectively determine the presence and concentration of trace elements in materials. XRF involves providing an x-ray inciting signal into the material and then measuring the re-emitted x-rays from the material. The absorbance and re-emission are depended on state transitions of the electrons and can be used to identify the elements in the material.

Other methodologies also exist for making determinations. For example, intramolecular bond energy patterns can be measured. Similarly, the oxidation state of elements in the product can be assessed. Similarly, chirality, structural information, or other features of the chemical marker can be used to store information. Accordingly, while XRF is discussed in some examples, it will be clear to a person of ordinary skill in the art that this approach can be readily implemented with any appropriate inspection technology. A non-exhaustive list of tests includes: energy-dispersive X-ray spectroscopy (EDX), inductively coupled plasma (ICP), atomic absorption spectroscopy (AAS), X-ray photoelectron spectroscopy (XPS), particle induced X-ray emission (PIXE). XRF, GC-MS, auger electron spectroscopy (AES), NMR, Fourier transform infrared (FTIR), secondary ion mass spectroscopy (SIMS), surface plasmon resonance (SPR), Raman spectroscopy, fluorescent binding of atoms or molecules, analytical chemistry techniques, gene sequencing, protein binding, etc. Tests may be destructive or non-destructive.

As used in this specification and the associated claims, a state is a unique combination of material composition that is associated with non-compositional information about the associated product. The number of states may be determined by multiplying the number of potential states for each element being used to convey information. Thus, if there are three elements with five, five, and eight potential distinguishable compositions respectively, then the system have the ability to provide 5×5×8 or 200 states, where each state may be associated with different non-compositional product information. A state may be associated with the information using of a look up table, an index, an algorithm, or other similar approaches.

Among other examples, this specification describes a method of extracting information encoded in a product, including: determining a concentration of a non-functional amount of a chemical in a product, where the concentration corresponds to one of a plurality of possible concentrations, where each of the plurality of possible concentration indicates different manufacturing information about the product.

This specification also describes a non-transitory computer readable medium (CRM) including instructions which, when executed on a processor, cause the processor to perform actions including: receiving concentrations of a plurality of trace elements added to a good; and consulting an index to determine manufacturing information based on the concentrations of the plurality of trace elements added to the goods wherein the concentrations correspond to one of a plurality of non-zero concentrations of the trace elements Among other examples, this specification also describes a product containing chemicals, where the product includes: an amount of a reference chemical and a non-functional amount of a first chemical. A concentration of the first chemical relative to a concentration of the reference chemical indicates a manufacturing source of the product.

Turning to the figures, FIG. 1 shows a flowchart of a method (100) according to one example of the subject matter described in this specification. The method (100) includes determining a concentration of a non-functional amount of a chemical in a product, wherein the concentration corresponds to one of a plurality of possible concentration ranges, wherein each of the plurality of possible concentration ranges indicates different manufacturing information about the product (110).

Determining a concentration of a non-functional amount of a chemical in a product can be performed in a variety of ways. For example, a portion of the product may be subjected to a non-destructive measurement technique, for example, EDX. In another example, a portion of the product may be dissolved and then processed, for example, by AAS or GC-MS. The measurement may be taken at a specific location in the product, for example, a corner, a face, or other feature to reduce geometry effects on the measurement.

Concentration can be relative or absolute concentration. In some examples, at least one element is selected as a reference. The reference provides a baseline against which to assess the other elements. For example, a product may use a combination of sodium chloride and potassium chloride where the chloride is use as a reference and the ratio of sodium to chloride and/or the ratio of potassium to chloride are used to encode information. In some examples, the total concentration of the salts is fixed and the ratio of the two salts changes. For example, the ratio of sodium to potassium could change to reflect the encoded information. Further, the use of relationships between the chemicals may be used to enhance the confidence levels of measurements. This may be performed, for example, using principle component analysis. Alternately, this may be performed by scaling and averaging the respective measurements. For example, in the case above the total chloride concentration may be the sum of the sodium and potassium concentrations. Accordingly, [Na] may be estimated by the average of [Na] and [Cl] minus [K]. This allows the potassium measurement to be used as a redundant sodium measurement reducing the total error of the composite. Similar relationships can be used with other system to provide enhanced measurement accuracy. For example, consider a two trace element system of $NaCl$ and $KPO_4$. Measurements of sodium and chloride are redundant and can be combined to make a combined estimate of [NaCl] in the system. Because the NaCl is provided in a 1 to 1 ratio, combining the measurements to include the redundant signals may reduce the overall error of the concentration measurement. Similarly, the measurements of potassium and phosphate concentrations may be averaged to reduce the overall error of the concentration measurement.

Especially with atomic measurements, such as XRF, the ability to combine a variety of trace elements at an excess of 10 concentration levels provides a large number of states. The number of unique messages that can be conveyed is equal to the product of the number of states for each element. Thus, five elements capable of being detected at eight discernable concentrations each provides 8^5 or 32,768 states. This is equivalent to a fifteen bit message and allows the encoding of a large amount of lot of data. Because the number of possible states increases linearly with detectable concentrations and exponentially with number of detectable elements, the amount of information stored may be increased by the inclusion of more elements, even if the total amount of trace material added to the product remains constant.

Non-functional will be understood as not introducing changes that move the product outside the product design specification. In many cases, the inclusion of materials up to 0.1% or 1000 ppm will not induce functional changes in properties.

The concentration of the chemical added to the product is detectable using a methodology. In some examples, the chemical may be stable in the product and may not migrate, concentrate, or change form. The methodology of detecting the concentration may be reasonably priced, non-destructive, accurate, repeatable, etc. Using a defined test method or receiving procedure may reduce the variation from site to site and thus allows smaller discrete concentration windows. This, in turn, may allow more information to be encoded in the same concentration range. The location tested in the product may be selected based on the functional importance of the location. In one example, a corner with higher insulation value is selected to reduce any potential impact of the testing on the product.

Plurality indicates that the number of non-functional elements being evaluated is non-singular. As discussed above, the use of two elements with five states each allows for a total of 25 possible combinations while the use of a single element with 10 states allows 10 possible combinations. Accordingly, the use of multiple signal elements may provide more possible states. Further, the use of multiple elements may allow the use of redundant elements to increase the reliability of the message system and reduce the possibility of error. Finally, in many systems, the incremental time to measure multiple elements or features is not notably greater than measuring a single element. Accordingly, the time increase and therefore the process cost increase from measuring multiple elements is negligible. Engineering judgement and gage type repeatability and reproducibility ("R&R") studies provide an effective basis for balancing the repeatability vs. amount of information tradeoff.

As used herein, the term "manufacturing information" excludes the concentrations of the trace chemicals. This is because the information about the trace chemical concentrations inherently discloses this information. Instead the concentrations encode other information which would not be readily discernable without access to the index, lookup table, algorithm, or similar decoding tool. Functional elements may also be used to encode information as long as they are maintained within the product specifications and the variation does not negatively impact the product performance.

For example, consider the UNS S30100 specification for 301 stainless steel. This material has the specifications of Fe, <0.15% C, 16-18% Cr, 6-8% Ni, <2% Mn, <1% Si, <0.045% P, <0.03% S. Assume iron (Fe) makes up the residual of the material. Assume chrome can be measured to 20 ppm. While the listed elements are all functional materials in the steel specification, the specific concentrations may be variable without moving the material outside of the useful range. For example, assume that manganese was optimal for the product between 0.5% and 1.5%. Over that range, manganese effective operates as a non-functional material and can be used to encode information. Accordingly, non-functional may refer to a functional material within the specification range. Similarly, nickel may be optimal between 6.500% and 7.500% which is a range of 10,000 ppm. If a test method has a resolution is 100 ppm then this corresponds to 100 discrete states that can be encoded in the nickel. If similar ranges and tolerance are used for the chrome and manganese, that corresponds with $100^3$ or 1 million states encoded in those three elements. Reducing the ranges to 20 ppm increases this to 125 million states. This does not include additional, non-functional elements. Accordingly, a large amount of information can be readily encoded into the state information of materials.

In other examples related to FIG. 1, an initial step in the method may include providing an index to a manufacturer of the product, the index relating concentration ranges to non-composition manufacturing information. The manufacturer may then use this index either to prepare products with manufacturing information encoded in a concentration of a non-functional chemical in the product or identify manufacturing information about a product or product component based on the concentration therein of a non-functional chemical that is listed on the index.

FIG. 2A shows a flowchart describing an example of the subject matter described herein. In one example, the operations of FIG. 2A are performed by a processor operating in accordance with instructions in a non-transitory, machine readable format. The processor performs the tasks of: receiving concentrations of a plurality of trace elements added to a good (210); and consulting an index to determine manufacturing information based on the concentrations of the plurality of trace elements added to the good wherein the concentrations correspond to one of a plurality of non-zero concentrations of the trace elements (220).

The instructions to control a processor to perform follow the flowchart of FIG. 2A may be stored on a computer readable medium (CRM) (200). The computer readable medium is a non-transitory memory device.

In one example, the processor is associated with an analytical instrument that determines the concentrations of the trace elements. However, in other examples, the processor is remote. For example, a company may have suppliers perform receiving inspections. The suppliers may then provide the concentrations to a processor which accesses or houses a central database, lookup table, index, etc. containing the information associated with various composition states. The remote processor receives the measurement and makes a determination about the part and then provides an answer to the system performing the analysis. In one example, the answer is a simple pass/fail response that keeps the actual information in the database secure and opaque to the supplier performing the test. The data exchange may be performed over a secure connection. In one example, the data exchange is performed using public key encryption. In one example, the concentration information of product is used as part of the encryption key. The inquiry and result may be recorded, for example in a tracking database. For example, the database may mark a given entry as being received at a particular supplier at a given date and time. This information can then be used to trace the flow of subcomponents.

Figure 2B:
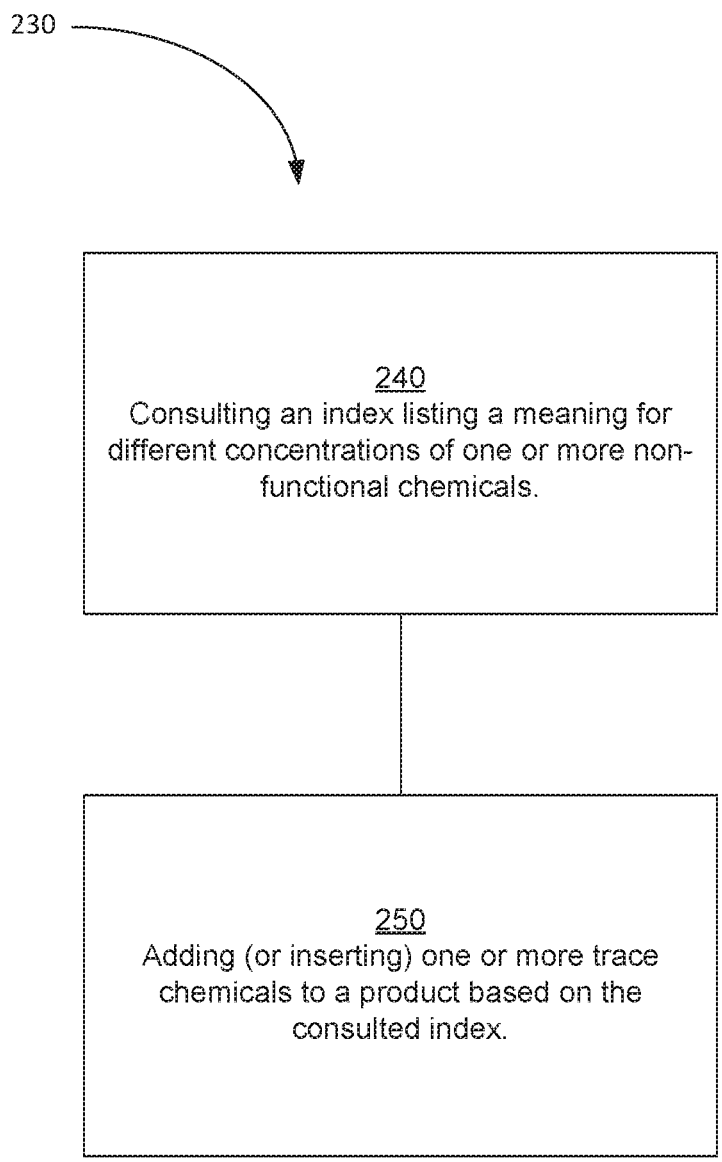

FIG. 2B is a flowchart showing an example method of making a product consistent with implementations described herein. As shown in FIG. 2B, this example method (230) includes consulting (240) an index listing a meaning for different concentrations of one or more non-functional chemicals in a product. This meaning corresponds, for example, to manufacturing information specific to the product.

Consequently, the manufacturer then adds (250) or inserts one or more trace chemicals into a product in a concentration corresponding to the meaning from the index which the manufacturer wants to encode into the product. As elsewhere, these trace chemicals are non-functional with respect to the purpose of the product.

Figure 2C:
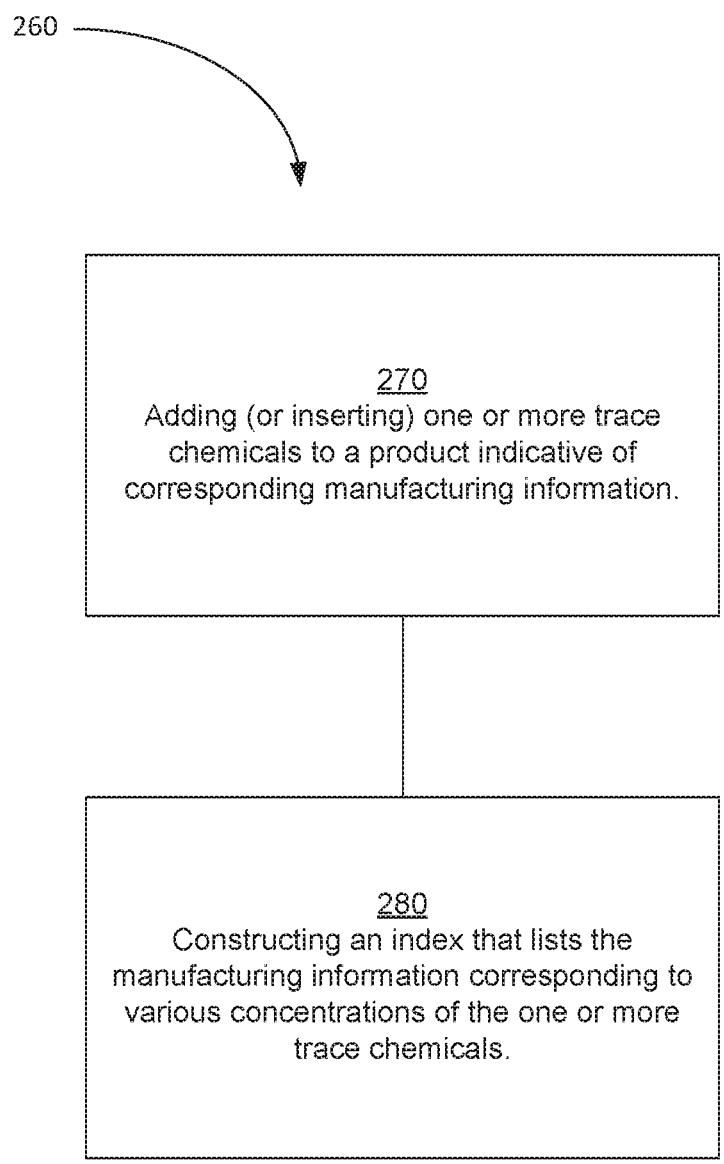

FIG. 2C is a flowchart showing an example method (260) of making a product consistent with implementations described herein. As shown in FIG. 2C, a manufacturer adds or inserts (270) one or more trace chemicals to a product at a particular concentration that is indicative of manufacturing information that the manufacturer wants to encode into the product. As elsewhere, these trace chemicals are non-functional with respect to the purpose of the product.

The manufacturer may then construct (280) an index or key that lists the manufacturing information corresponding to various concentrations of the one or more trace chemicals. This index would then be provided to users wanting to decode the manufacturing information for the product based on the inclusion of the trace chemical(s).

FIG. 3A shows a table (300) with a number of test records (310), the test records (310) including a determination of the concentration of a reference element (330), in this example, chlorine present as chloride and a non-functional first element (320), in this example sodium.

The test records include a concentration of a reference element (330) and a non-functional first element (320). These two concentrations can be combined to calculate a relative concentration of the non-functional first element (320) relative to the reference element (330).

One challenge with the use of trace elements to convey information is that the concentrations may be low and, to increase the amount of information conveyed, the concentration windows may be narrow. This makes the uniform distribution of the trace elements a relevant factor in the concentration measurement of the trace elements. Unequal distribution can produce local variation in the concentrations that may move the local concentration outside the desired state. The use of a reference element (330) may reduce the impact on non-uniform distribution. If the reference element (330) is added at the same time and manner as the non-functional element (320), then their distribution should be similar. Accordingly, the impact of mixing may be reduced.

This can be a challenge when using trace elements that are not homogenous in the product. For example, silicates tend to not dissolve in some metal alloys and are found as particles in the metal. These particles may be randomly distributed resulting different measurements for silicon (and oxygen) depending on the amount of particulate in the measured area. The impact of these types of heterogeneities can be addressed during selection of the trace materials being used. For example, a gage R&R study that provides an assessment of the reproducibility of a measurement method may also provide information about the sample to sample variation as well as the measurement variation. In some instances, assessment of the within part variation may be helpful, for example, by measuring multiple positions on a given part as part of the study.

Some materials, most notably polymers and metals, have a tendency to distribute materials to the surface and/or interior. For example, low surface energy components of polymers tend to "bloom" to the surface. Similarly, oxides tend to be more stable on the surfaces of metals, especially those quenched or cooled in environments where oxygen is available. In some examples, the use of a reference element (330) helps to compensate for non-uniformity through a depth of the material.

It may also be helpful to consider the measurement method when establishing baselines for the trace elements. Most measurement modalities involve some sort of activating signal provided to the material and a signal being returned or an absorption being detected from the material. The distribution of the applied signal and the returning signal can impact the measurement. For example, XDS uses an electron beam applied to a surface and measures emitted X-rays. EDX uses an applied x-rays beam and measures emitted electrons. Both of these methods measure composition, however, the applied X-rays of XDS activate a mushroom like target area and the emitted X-rays pass relatively unimpeded to the detector. In contrast, the applied x-rays of EDX penetrate deeply into a target but usually the electrons emitted by the surface are able to pass outward to the detector. Thus, despite the similarity, these two techniques produce very different compositional measurements. Again, the use of a reference concentration can reduce the impact of testing modality and unequal distributions.

FIG. 3B shows an index (350-1) according to an example of the subject matter described herein. The index (350-1) includes a plurality of ranges (360) each defined but a lower bound (362) and an upper bound (364). Each range is associated with encoded data which contains encoded information (370) or is left blank to indicate the range is not in use and any parts falling within the blank range are counterfeit or do not meet specification.

FIG. 4 shows an example of an index (350-2) showing the use of different types of information available at different resolutions. The index includes a plurality of ranges (360) but includes a first type of encoded information (370-1) and a second type of encoded information (370-2).

In one example, the information is encoded in the oxidation state of a trace element. The information may be encoded in the oxidation states of multiple elements. The oxidation states of elements may be used as a secondary measure to enhance the resolution of a measurement. For example, if iron (Fe) and chlorine (CI) are just present as a ratio of $FeCl_2$ and $FeCl_3$ then the relative concentrations of Fe and CI are redundant to the $Fe^{2+}$ to $Fe^{3+}$ ratio. Accordingly, in some circumstances, measurement of both may allow a reduced error on the determined ratio.

The information content of the states may be grouped so as to allow one level of information to be determined with a first accuracy of measurement and a second level of information to be determined with a second, greater accuracy of information. The first level of information may be, for example, the manufacturing plant of the product. The second level of information may be, for example, the specific date of manufacture. Thus, for routine operations, the first level of information may be sufficient for establishing that the component is legitimate. However, in the event of a failure investigation, the second level of measurement may be used to obtain the additional information.

To provide a specific example, assume manganese is being used as the trace element encoding information. Assume that using test method one, the manganese concentration is resolvable to +/−50 ppm. Assume that using test method two, manganese concentration is resolvable to +/−20 ppm. An index could be formulated as below to convey these two levels of information.

This approach can be used more generally, for example, the presence of certain trace elements may be sufficient to establish that a part is legitimate. However, the concentration may be used to convey additional information, which while not often used, is retrievable using additional testing. In one example, this may be the detection of a trace element or a bond.

The trace component may be an organic molecule. For example, the trace component may be an oligomer and/or polymer with different functional groups than a bulk polymer. In one example, the organic molecule includes sulfur atom, for example a thiol. In another example, the polymer includes a nitrogen containing group, for example an amide. The organic molecule may be a copolymer. The ratios of the groups in the organic molecule may be prepared separately and added as pellets during extrusion. Bonds with bond energies not otherwise found in the bulk polymer may be used as markers.

The trace component may be a piece of genetic material or a synthetic equivalent, for example, DNA, RNA, cDNA. Such a trace component may include a distinctive length or lengths after cutting with a restriction enzyme. This approach to a trace component has the ability to encode a vast amount of information in a material. In one example, the genetic material is created, placed into a microorganism and multiplied and then extracted, purified, and added to the material. The genetic material may be coded in to the DNA of the microorganism. The genetic material may be added as a portion of or the complete content of a plasmid, for example, in a bacterium.

While DNA, RNA, or similar structures have advantages in terms of existing equipment and techniques for extraction, multiplication, encoding, and decoding, nothing prevents the application of similar methods to store information in different molecules. For example, information may be stored as pendant groups from a silicone or other polymer backbone. The backbone can also be used to store information. The encoding and storage of information within trace components of materials provides a way to encode information unobtrusively in products with long term stability and recoverability.

As discussed above, the composition of trace elements, including phosphorous and nitrogen may be used to provide a first level of information, while the actual encoded sequence in the material may be decoded as part of non-routine operations. In one example, the first level of information is available using a non-destructive test while extracting the second level of information involves a destructive test of the material in the device.

Another option is to add the trace materials and then perform a measurement on the fabricated subcomponent. The measurement is then used to populate an index for later reference. This is especially helpful when monitoring functional components as well as non-functional components. For example, considering the 301 stainless steel specification above, it may be feasible to determine the iron, chrome, and manganese concentrations and use these as classification features even if they are not adjusted to increase identifiability.

In one example, a material is subject to a characterization and that characterization is recorded along with process information describing the relevant lot of material. If the number of variables measured is reasonably high and the number of states per variable is reasonably high then the odds of overlap between lots is relatively low. Further, even with overlap, such information drastically reduces the number of potential lots when conducting a failure analysis. Specifically, the number of lots is reduced by dividing by the number of potential states (on average).

FIG. 5 shows an example of a multiple component index (350-3) and the associated information (370). As discussed above, the use of multiple trace components allows a large number of states. The used and unused states may be grouped to minimize errors or allow different amounts of information to be detectable under different measurement techniques. The states may be predetermined and the material modified to obtain a desired composition. In another example, the material may be formed with a number of trace components and the measurements may be used to populate the index, database, look-up table, or similar structure used to hold the relationship between composition and the encoded information.

Figure 6:
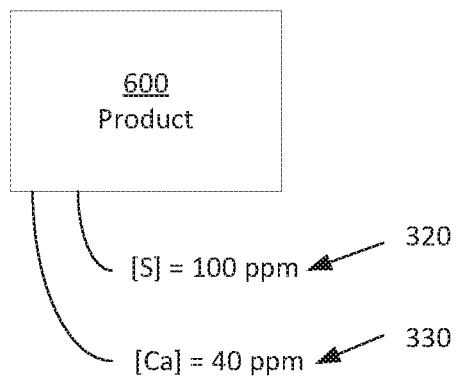
FIG. 6 shows a product according to one example of the subject matter described herein.

FIG. 6 shows a product (600) according to one example of the material described herein. The product (600) has a non-functional amount of a first chemical (320) and a reference chemical (330). The concentration of the first chemical relative to a concentration of the reference chemical indicates a manufacturing source of the product.

As shown in the figure, the product (600) has a concentration of 100 ppm sulfur and 40 ppm calcium. The calcium serves as the reference element. Accordingly, the relative concentration of sulfur to calcium is 100 ppm divided by 40 ppm or 2.5. This value indicates the manufacturing location of the product, in this case, a manufacturing facility in Albany. Other non-concentration information may be encoded within the concentration of the first chemical (320) or in additional chemicals. In one example, the date of manufacture is encoded. The revision of the manufacturing procedure used may be encoded. Depending upon the resolution of the detection methods available, the control over formulation, and the number of resolvable chemicals used, a variable amount of information may be encoded in a given product. In some examples, some combinations are left unassociated with information to indicate a counterfeit product. The counterfeit detecting combinations may include zero concentrations of a chemical. In one example, a zero concentration of all the non-functional chemicals is associated with counterfeit products.

It will be appreciated that, within the subject matter described by this specification, a vast number of variations exist. It should also be appreciated that the examples described are only examples, and are not intended to limit the scope, applicability, or construction of the claims in any way.

What is claimed is:

1. A method of extracting information encoded in a product, the method comprising:
    determining concentrations of a non-functional amount of a plurality of chemicals in a product, wherein the concentrations independently correspond to one of a plurality of possible concentration ranges, wherein each of the plurality of possible concentration ranges indicates different non-composition manufacturing information about the product, wherein the concentrations of the plurality of chemicals are different at multiple locations of the product, but the plurality of non-functional chemicals are distributed at those multiple locations at the same ratio.

2. The method of claim 1, further comprising inserting the non-functional amounts of the plurality of chemicals in the product.

3. The method of claim 1, wherein one concentration functions as a reference concentration and the other concentration is assessed in terms of the reference concentration.

4. The method of claim 1, wherein determining the concentrations is performed with X-ray fluorescence (XRF).

5. The method of claim 1, wherein one of the chemicals is a salt.

6. The method of claim 1, wherein one of the chemicals is an organic chemical.

7. The method of claim 6, wherein one of the chemicals is genetic material.

8. The method of claim 1, wherein the determination of the plurality of concentrations distinguishes two oxidation states of an element in the product.

9. A non-transitory computer readable medium (CRM) comprising instructions which when executed on a processor cause the processor to perform actions comprising:

receiving concentrations of a plurality of trace elements added to a product, wherein the concentrations of the plurality of trace elements are different at multiple locations of the product, but the plurality of trace elements are distributed at those multiple locations at the same ratio; and consulting an index to determine manufacturing information based on the concentrations of the plurality of trace elements added to the product wherein the concentrations correspond to one of a plurality of non-zero concentration ranges of the trace elements.

10. The computer readable medium of claim 9, wherein receiving concentrations of a plurality of trace elements added to a material in the product comprising receiving the concentrations over a connection.

11. The method of claim 9, further comprising measuring the concentrations of the plurality of trace elements added to a material in the product using X-ray fluorescence (XRF).

12. A product containing chemicals, the product comprising:

an amount of a reference chemical distributed non-uniformly throughout the product; and a non-functional amount of a first chemical distributed non-uniformly throughout the product, wherein concentrations of the reference chemical and the first chemical are different at multiple locations of the product, but the reference chemical and the first chemical are distributed at those multiple locations at the same ratio, indicating a manufacturing source of the product.

13. The product of claim 12, further comprising:

a non-functional amount of a second chemical, wherein a concentration of the second chemical encodes non-composition information about the product.

14. The product of claim 13, wherein the first chemical and the second chemical are counter ions of the reference chemical.

15. The method of claim 3, wherein a sum of the reference concentration and the other concentration in the product are fixed and the ratio of the reference concentration to the other concentration provide the manufacturing information.

16. The method of claim 1, wherein each of the plurality of concentrations of the plurality of chemicals has a plurality of states and each of the states represent unique encoding information for the manufacturing information.

17. The method of claim 1, further comprising identifying manufacturing information about the product based on the ratio of the plurality of concentrations relative to one another at multiple locations.

* * * * *